(12) United States Patent
Myers

(10) Patent No.: US 10,408,119 B2
(45) Date of Patent: Sep. 10, 2019

(54) CHARGE AIR COOLER CONDENSATION MANAGEMENT DEVICE

(71) Applicant: GM Global Technology Operations LLC, Detroit, MI (US)

(72) Inventor: John W. Myers, Howell, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 259 days.

(21) Appl. No.: 15/486,635

(22) Filed: Apr. 13, 2017

(65) Prior Publication Data

US 2018/0298809 A1    Oct. 18, 2018

(51) Int. Cl.
  *F02B 29/04*    (2006.01)
  *F02M 35/10*    (2006.01)
(52) U.S. Cl.
  CPC ... *F02B 29/0468* (2013.01); *F02M 35/10157* (2013.01); *F02M 35/10222* (2013.01); *F02M 35/10255* (2013.01); *Y02T 10/144* (2013.01); *Y02T 10/146* (2013.01)
(58) Field of Classification Search
  CPC .......... F02B 29/0468; F02M 35/10157; F02M 35/10222; F02M 35/10255; Y02T 10/144; Y02T 10/146
  See application file for complete search history.

(56) References Cited

U.S. PATENT DOCUMENTS

| | | | |
|---|---|---|---|
| 9,267,424 B2* | 2/2016 | Wicks | F02B 29/0468 |
| 9,297,296 B2* | 3/2016 | Kuske | F02B 37/00 |
| 2004/0050373 A1* | 3/2004 | Gao | F02M 26/27 |
| | | | 123/568.12 |
| 2008/0028757 A1* | 2/2008 | Eitel | F01N 3/021 |
| | | | 60/311 |
| 2011/0094219 A1* | 4/2011 | Palm | F02B 29/0468 |
| | | | 60/599 |
| 2015/0167539 A1* | 6/2015 | Basile | F02B 29/0468 |
| | | | 60/599 |
| 2015/0285128 A1* | 10/2015 | Cardwell | F02B 29/0468 |
| | | | 60/599 |

* cited by examiner

*Primary Examiner* — Jesse S Bogue

(57) ABSTRACT

A condensation management device includes: a first chamber that receives liquid from an outlet of a charge air cooler (CAC) and that includes an aperture through a bottom-most wall of the first chamber; a second chamber that receives liquid from the first chamber when the aperture is open and that outputs liquid received from the first chamber to an intake system of an engine at a location between the CAC and a throttle valve; and a valve configured to open the aperture when at least one of: (i) a mass of the liquid within the first chamber is less than a predetermined mass; and (ii) a first pressure within the first chamber is greater than or equal to a second pressure within the second chamber. The valve is configured to block the aperture when (i) and (ii) are not satisfied.

20 Claims, 6 Drawing Sheets

CHARGE AIR COOLER CONDENSATION MANAGEMENT DEVICE

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to internal combustion engines of vehicles and more particularly to devices for removing condensation from an air-to-air charge air cooler receiving output from a turbocharger.

Internal combustion engines draw air into an intake manifold through an induction system that may be regulated by a throttle. The air in the intake manifold is distributed to a plurality of cylinders and combined with fuel to create an air/fuel (NF) mixture.

The NF mixture is combusted within the cylinders to drive pistons. The pistons drive rotation of a crankshaft to generate drive torque. The drive torque is transferred to a driveline of a vehicle via a transmission. Exhaust produced during combustion may be expelled from the cylinders into an exhaust manifold and treated by an exhaust treatment system before being released to the atmosphere.

Gas within a cylinder (e.g., resulting from combustion of air and fuel) may enter a crankcase of the engine. For example, gas from the cylinders may enter the crankcase between piston rings and the cylinder walls. Gas that enters the crankcase and gas within the crankcase may be referred to as blow-by vapor.

The crankshaft is located within the crankcase. The crankcase also includes oil for lubricating the movement of the crankshaft, the pistons, and other moving parts of the engine. Blow-by vapor may contaminate the oil and is evacuated out of the crankcase to prevent excessive pressure within the crankcase via a positive crankcase ventilation (PCV) system. Oil droplets and water droplets may also be present in blow-by vapor evacuated out of the crankcase.

SUMMARY

In a feature, a condensation management device that removes liquid from a charge air cooler (CAC) receiving output from a turbocharger compressor of an engine is described. The condensation management device includes a first chamber including: a first outlet port connected to an intake manifold of the engine, where air flows from the first chamber through the first outlet port to the intake manifold; a first inlet port connected to an outlet of the CAC, where liquid flows from the outlet of the CAC into the first chamber through the first inlet port when air flows from the first chamber through the first outlet port to the intake manifold; and an aperture through a bottom-most wall of the first chamber. The condensation management device also includes a second chamber including: a second inlet port connected to a first location between an outlet of the turbocharger compressor and the CAC, where air flows into the second chamber from the first location through the second inlet port; and a second outlet port connected to a second location between the CAC and a throttle valve of the engine, where liquid flows from the second chamber through the second outlet port into an intake system of the engine at the second location. The condensation management device also includes a valve configured to: block the aperture when a mass of the liquid within the first chamber is less than a predetermined mass while a first pressure within the first chamber is less than a second pressure within the second chamber; and open the aperture when at least one of (i) the mass of the liquid within the first chamber is greater than the predetermined mass and (ii) the first pressure within the first chamber is greater than or equal to the second pressure within the second chamber. Liquid flows from the first chamber into the second chamber through the aperture when the aperture is open.

In further features, the first chamber further includes a third inlet port connected to a crankcase of the engine, where gas flows from the crankcase into the first chamber through the third inlet port.

In further features, the first chamber further includes a second valve configured to close the third inlet port when the first pressure within the first chamber is greater than a third pressure within the crankcase and to open the third inlet port when the first pressure within the first chamber is less than the second pressure within the crankcase. Gas flows from the crankcase into the first chamber through the third inlet port when the third inlet port is open.

In further features, the second valve includes a ball check valve.

In further features, air flows from the first chamber through the first outlet port to the intake manifold when a first pressure within the intake manifold is less than a second pressure within the first chamber.

In further features, air flows into the second chamber from the first location through the second inlet port when a third pressure at the location is greater than a fourth pressure within the second chamber.

In further features, a bottom wall of the first chamber is tapered toward the aperture.

In further features, a bottom wall of the second chamber is tapered toward the second outlet.

In further features, a bottom wall of the second chamber is tapered toward the second outlet.

In further features, the first inlet port connected to a bottom most portion of the outlet of the CAC.

In further features, the valve is implemented within the second chamber.

In further features, a venturi is connected between the second outlet port and the second location between the CAC and the throttle valve of the engine.

In further features, an orifice plate is connected between the first outlet port and the intake manifold.

In further features, a vehicle includes: the condensation management device; the turbocharger compressor; the CAC; the throttle valve; the intake manifold; and the engine.

In further features, a positive crankcase ventilation (PCV) system vents gas from a crankcase of the engine to a first location upstream of the turbocharger compressor when a first pressure within the crankcase is greater than a second pressure at the first location.

In further features, the PCV system further vents gas from the crankcase to a second location upstream of the turbocharger compressor when the first pressure within the crankcase is greater than a third pressure at the second location.

In further features, the first chamber of the condensation management device further includes a third inlet port connected to the crankcase of the engine, where gas flows from the crankcase into the first chamber through the third inlet port.

In further features, a venturi is connected between the second outlet port of the condensation management device and the second location between the CAC and the throttle valve.

In further features, an orifice plate is connected between the first outlet port of the condensation management device and the intake manifold.

In a feature, a condensation management device that removes liquid from a charge air cooler (CAC) receiving output from a turbocharger compressor of an engine is described. The condensation management device includes: a first chamber that receives liquid from an outlet of the CAC and that includes an aperture through a bottom-most wall of the first chamber; a second chamber that receives liquid from the first chamber when the aperture is open and that outputs liquid received from the first chamber to an intake system of the engine at a location between the CAC and a throttle valve; and a valve configured to: block the aperture when a mass of the liquid within the first chamber is less than a predetermined mass while a first pressure within the first chamber is less than a second pressure within the second chamber; and open the aperture when at least one of (i) the mass of the liquid within the first chamber is greater than the predetermined mass and (ii) the first pressure within the first chamber is greater than or equal to the second pressure within the second chamber.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A positive crankcase ventilation (PCV) system vents gas (also referred to as blow-by vapor) from a crankcase of an engine to an intake system of the engine. For example, the PCV system may vent gas from the crankcase to one or more locations upstream of a turbocharger compressor and one or more other locations.

A charge air cooler (CAC) cools the compressed output of the turbocharger compressor. Liquid, however, condenses and collects within the CAC. For example only, the liquid may include water from intake air, water from blow-by vapor, and engine oil from blow-by vapor. Also, frozen water within the CAC may melt and collect within the CAC.

If too much liquid collects within the CAC, however, the liquid may be drawn to the engine and cause engine misfire, stalling, flooding, etc. The liquid may be drawn to the engine, for example, via vacuum within the intake manifold when the vehicle accelerates. Under some circumstances, such as when ambient temperature is less than the freezing point temperature of water, water within the CAC may freeze. Frozen water within the CAC may restrict airflow through the CAC and to the engine.

According to the present disclosure, a condensation management device draws liquid out of the CAC and introduces the liquid back to the intake system of engine. The condensation management device includes a first chamber and a second chamber. Liquid is drawn from the CAC into the first chamber via intake manifold vacuum.

A valve of the condensation management device remains closed when less than a predetermined amount of water is present within the first chamber of the condensation management device. When more than the predetermined amount of water is present within the first chamber, the valve opens and allows liquid to flow from the first chamber into the second chamber. The pressurized output of the turbocharger compressor forces liquid from the second chamber and into the air stream upstream of the throttle valve for ingestion into the engine. In various implementations, liquid flow to the air stream may be metered, for example, using a venturi. The condensation management device therefore minimizes a possibility of liquid flow from the CAC directly to the engine and removes liquid resulting from melting of ice within the CAC.

Figure 1:
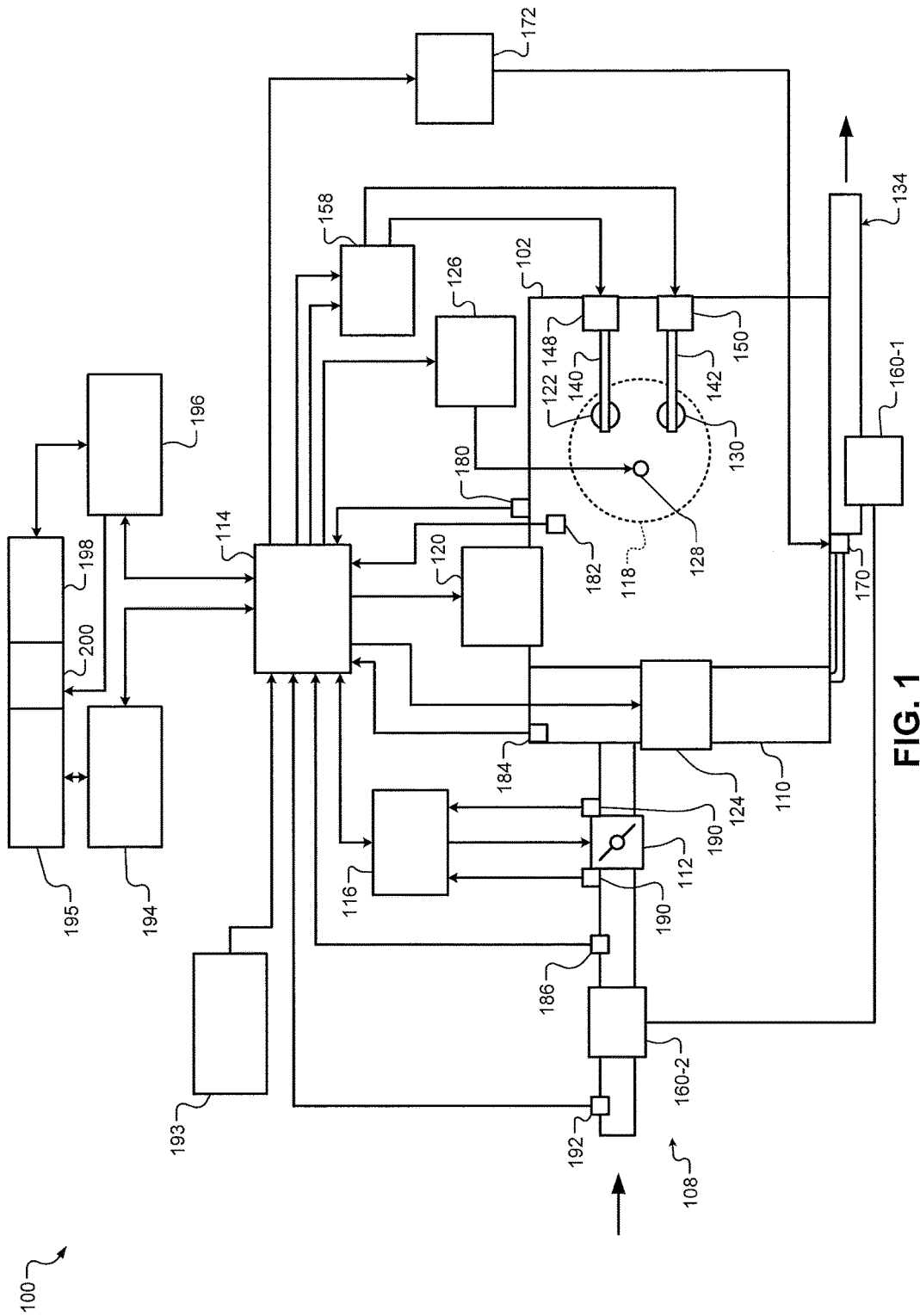
FIG. 1 is a functional block diagram of an example powertrain system of a vehicle.
Figure 2:
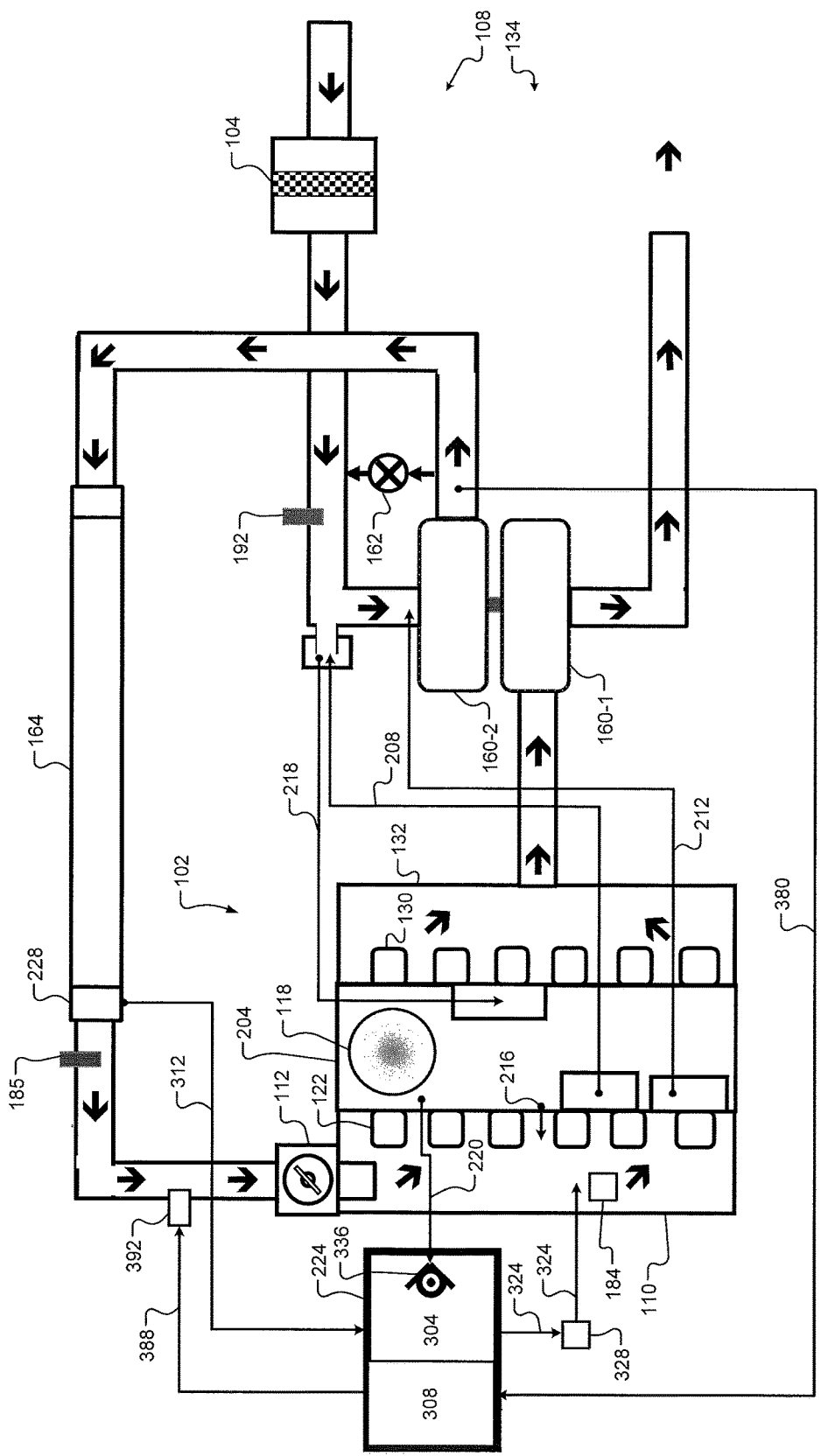
FIG. 2 is a functional block diagram of an example engine system including a condensation management device.

FIG. 1 includes a functional block diagram of an example powertrain system 100. FIG. 2 includes a functional block diagram including an engine, an intake system, a condensation management device, and an exhaust system. Referring now to FIGS. 1 and 2, the powertrain system 100 of a vehicle includes an engine 102 that combusts an air/fuel mixture to produce torque. The vehicle may be non-autonomous or autonomous.

Air is drawn into the engine 102 through an intake system 108. An air filter 104 may filter air flowing into the intake system 108. The intake system 108 includes an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102. While the engine 102 includes multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders under some circumstances, which may improve fuel efficiency.

The engine 102 may operate using a four-stroke cycle or another suitable engine cycle. The four strokes of a four-stroke cycle, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes. For four-stroke engines, one engine cycle may correspond to two crankshaft revolutions.

When the cylinder 118 is activated, air from the intake manifold 110 is drawn into the cylinder 118 through an intake valve 122 during the intake stroke. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers/ports associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. Some types of engines, such as homogenous charge compression ignition (HCCI) engines may perform both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may disable provision of spark to deactivated cylinders or provide spark to deactivated cylinders.

During the combustion stroke, the combustion of the air/fuel mixture drives the piston down, thereby driving the crankshaft. The combustion stroke may be defined as the time between the piston reaching TDC and the time when the piston returns to a bottom most position, which will be referred to as bottom dead center (BDC).

During the exhaust stroke, the piston begins moving up from BDC and expels the byproducts of combustion through an exhaust valve 130 to an exhaust manifold 132. The byproducts of combustion are exhausted from the exhaust manifold 132 and the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). While camshaft based valve actuation is shown and has been discussed, camless valve actuators may be implemented. While separate intake and exhaust camshafts are shown, one camshaft having lobes for both the intake and exhaust valves may be used.

The cylinder actuator module 120 may deactivate the cylinder 118 by disabling opening of the intake valve 122 and/or the exhaust valve 130. The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. In various implementations, cam phasing may be omitted. Variable valve lift (not shown) may also be controlled by the phaser actuator module 158. In various other implementations, the intake valve 122 and/or the exhaust valve 130 may be controlled by actuators other than a camshaft, such as electromechanical actuators, electrohydraulic actuators, electromagnetic actuators, etc.

A turbocharger provides pressurized air to the engine 102. The turbocharger incudes a turbocharger turbine 160-1 that is driven by exhaust gas flowing through the exhaust system 134. The turbocharger also includes a turbocharger compressor 160-2 that is mechanically driven by the turbocharger turbine 160-1 and that compresses air leading into the throttle valve 112.

A turbo bypass valve (TBV) 162 may be implemented to control output of the turbocharger compressor 160-2. More specifically, the TBV 162 may allow compressed air output from the turbocharger compressor 160-2 to flow back to the input side of the turbocharger compressor 160-2, thereby bypassing the turbocharger compressor 160-2. A boost actuator module (not shown) may control opening of the TBV 162 based on signals from the ECM 114.

A charge air cooler (CAC) 164 cools the output from the turbocharger compressor 160-2. More specifically, the CAC 164 transfers heat from gas flowing through the CAC 164 to air around the CAC 164. Although shown separated for purposes of illustration in FIG. 1, the turbocharger turbine 160-1 and the turbocharger compressor 160-2 are mechanically linked to each other, as shown in FIG. 2, such that heat from the exhaust system 134 may be transmitted to the turbocharger compressor 160-2.

The engine 102 may include an exhaust gas recirculation (EGR) valve 170, which selectively redirects exhaust gas back to the intake manifold 110 or to a location upstream of the turbocharger compressor 160-2. The EGR valve 170 may receive exhaust gas from upstream of the turbocharger turbine 160-1 in the exhaust system 134. The EGR valve 170 may be controlled by an EGR actuator module 172.

Crankshaft position may be measured using a crankshaft position sensor 180. An engine speed may be determined based on the crankshaft position measured using the crankshaft position sensor 180. A temperature of engine coolant may be measured using an engine coolant temperature (ECT) sensor 182.

A pressure within the intake manifold 110 may be measured using a manifold absolute pressure (MAP) sensor 184. In various implementations, engine vacuum or boost pressure, which are refer to a difference between ambient air pressure and the pressure within the intake manifold 110, may be measured. A pressure at or upstream of the inlet of the throttle valve 112 may be measured using a throttle inlet air pressure (TIAP) sensor 185. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192. One or more other sensors 193 may also be implemented. The other sensors 193 include an accelerator pedal position (APP) sensor, a brake pedal position (BPP) sensor, may include a clutch pedal position (CPP) sensor (e.g., in the case of a manual transmission), and may include one or more other types of sensors. An APP sensor measures a position of an accelerator pedal within a passenger cabin of the vehicle. A BPP sensor measures a position of a brake pedal within a passenger cabin of the vehicle. A CPP sensor measures a position of a clutch pedal within the passenger cabin of the vehicle. The other sensors 193 may also include one or more acceleration sensors that measure longitudinal (e.g., fore/aft) acceleration of the vehicle and latitudinal acceleration of the vehicle. An accelerometer is an example type of acceleration sensor, although other types of acceleration sensors may be used. The ECM 114 may use signals from the sensors to make control decisions for the engine 102.

The ECM 114 may communicate with a transmission control module 194, for example, to coordinate engine operation with gear shifts in a transmission 195. The ECM 114 may communicate with a hybrid control module 196, for example, to coordinate operation of the engine 102 and an electric motor 198. While the example of one electric motor is provided, multiple electric motors may be implemented. In various implementations, various functions of the ECM 114, the transmission control module 194, and the hybrid control module 196 may be integrated into one or more modules.

Each system that varies an engine parameter may be referred to as an engine actuator. Each engine actuator has an associated actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark advance relative to cylinder TDC. Other engine actuators may include the cylinder actuator module 120, the fuel actuator module 124, the phaser actuator module 158, the boost actuator module, and the EGR actuator module 172. For these engine actuators, the actuator values may correspond to a cylinder activation/deactivation sequence, fueling rate, intake and exhaust cam phaser angles, target TBV valve opening, and EGR valve opening, respectively.

The ECM 114 may control the actuator values in order to cause the engine 102 to output torque based on a torque request. The ECM 114 may determine the torque request, for example, based on one or more driver inputs, such as an APP, a BPP, a CPP, and/or one or more other suitable driver inputs. The ECM 114 may determine the torque request, for example, using one or more functions or lookup tables that relate the driver input(s) to torque requests.

Under some circumstances, the hybrid control module 196 controls the electric motor 198 to output torque, for example, to supplement engine torque output. The hybrid control module 196 may also control the electric motor 198 to output torque for vehicle propulsion at times when the engine 102 is shut down.

The electric motor 198 may output torque, for example, to an input shaft of the transmission 195, to an output shaft of the transmission 195, or to another component. A clutch 200 may be implemented to couple the electric motor 198 to the transmission 195 and to decouple the electric motor 198 from the transmission 195. One or more gearing devices may be implemented between an output of the electric motor 198 and an input of the transmission 195 to provide one or more predetermined gear ratios between rotation of the electric motor 198 and rotation of the input of the transmission 195. Under other circumstances, the electric motor 198 generates and outputs power, for example, to recharge a battery. This may be referred to as regeneration.

Referring now to FIG. 2, the engine 102 includes a crankcase 204. Under some circumstances, gas within the cylinders may flow past the pistons of the cylinders, respectively, and into the crankcase 204. Such gas may be referred to as blow-by vapor. The crankshaft is included within the crankcase 204. The crankcase 204 also includes engine oil that lubricates various moving components of the engine 102, such as the crankshaft, connecting rods, etc.

The engine 102 includes a positive crankcase ventilation (PCV) system that vents gas from the crankcase 204 to the intake system 108. For example, a first one or more PCV tubes 208 may vent gas from a first PCV valve and the crankcase 204 to a first location upstream of the turbocharger compressor 160-2. A second one or more PCV tubes 212 may vent gas from a second PCV valve and the crankcase 204 to a second location upstream of the turbocharger compressor 160-2. Gas from the crankcase 204 may vent to the first and/or second locations, for example, when a pressure within the crankcase 204 is greater than a pressure upstream of the turbocharger compressor 160-2 and the pressure within the crankcase 204 is less than a pressure within the intake manifold 110.

A one or more internal PCV valves 216 may vent gas from the crankcase 204 to the intake manifold 110. Gas from the crankcase 204 may vent to the intake manifold 110 through the PCV valve(s) 216, for example, when the pressure within the crankcase 204 is greater than the pressure within the intake manifold 110. Fresh air may flow into the crankcase 204 from the first location upstream of the turbocharger compressor 160-2 via tube 218 when the PCV valve(s) 216 is/are open.

As discussed further below, a PCV tube 220 may vent gas from the crankcase 204 to a condensation management device 224. PCV tubes may vent gas from the crankcase 204 to their respective outlet locations when pressure within the crankcase 204 is greater than pressure at the respective outlet locations. Tubes can also be referred to as conduits.

Gas within the crankcase 204 may include water content, such as water resulting from combustion within the cylinders and/or water (condensation) formed via temperature changes. Other types of liquid may also be present in the gas within the crankcase 204. Ambient air flowing into the engine 102 may also have some water content (humidity>0%). Water content in the air flowing into the CAC 164 can condense within the CAC 164 and collect within a CAC outlet tank 228. The CAC outlet tank 228 may be located at a bottom of the CAC 164 such that water flows into the CAC outlet tank 228 by gravity.

Water within the CAC 164 can freeze, however, such as during cold ambient conditions. This frozen water within the CAC 164 can block or restrict airflow into the engine 102. Excess water within the CAC outlet tank 228 may be drawn directly into the engine 102 via vacuum within the intake manifold 110 and/or high pressure air flowing into the CAC 164. If water flows from the CAC 164 into the engine 102, the water may cause, for example, engine misfire and/or vapor lock of the engine 102.

The condensation management device 224 of the present disclosure receives water from the CAC outlet tank 228 and releases received water to a location between the throttle valve 112 and the CAC 164. In addition to water, the condensation management device 224 may also receive one or more other types of liquid from the CAC 164, such as liquid engine oil admitted to the intake system 108 by the PCV system. For simplicity of discussion, receipt and release of water will be discussed, but the water may also include other types of liquid.

Figure 3:
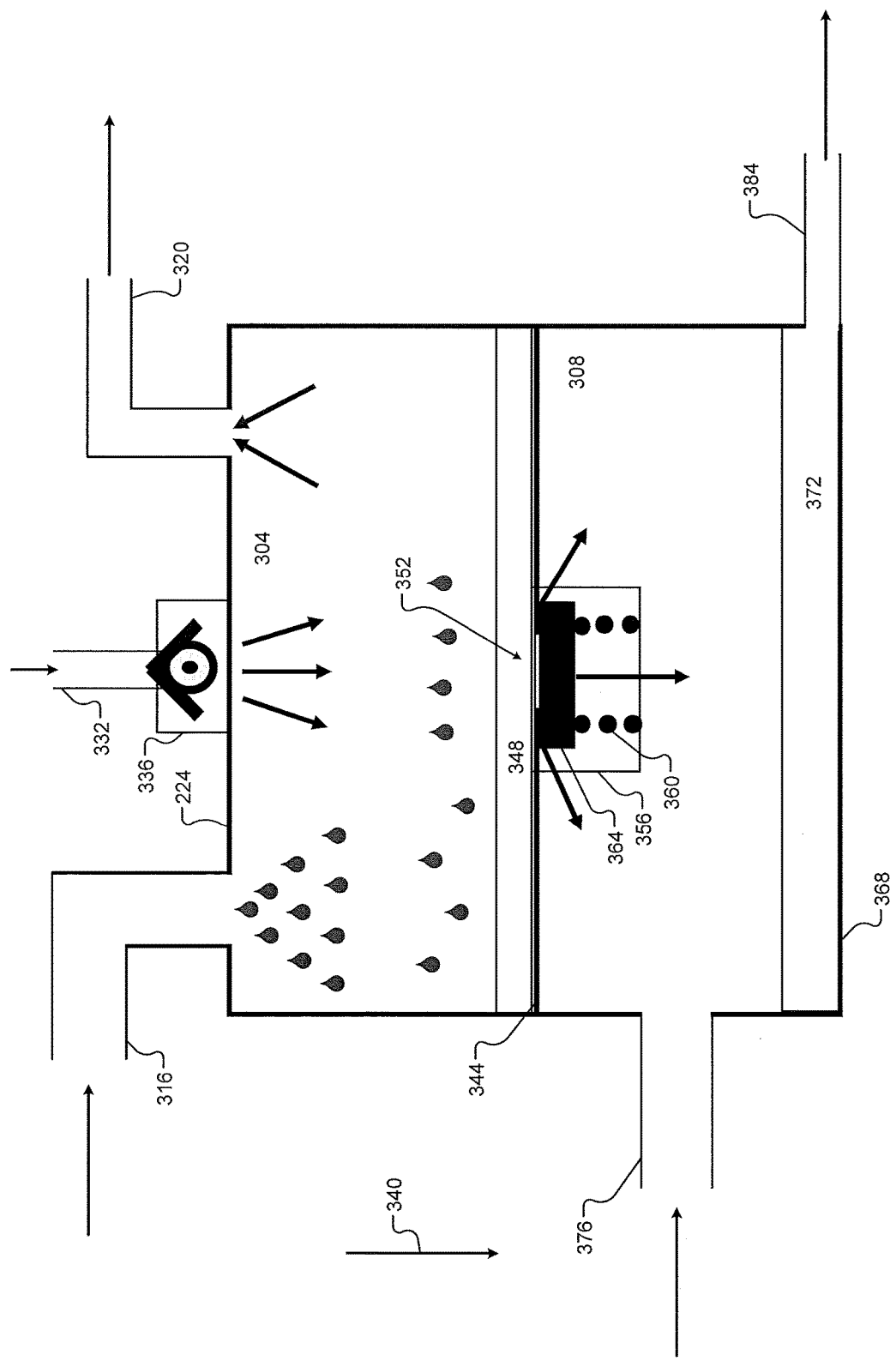
FIGS. 3-6 are cross-sectional views examples of the condensation management device.

FIG. 3 is a cross-sectional view of an example implementation of the condensation management device 224. Referring now to FIGS. 2 and 3, the condensation management device 224 includes a first chamber 304 and a second chamber 308. The condensation management device 224 receives water from the CAC outlet tank 228 via a first conduit 312 coupled between the CAC outlet tank 228 and a first inlet port 316 of the condensation management device 224. Specifically, water received from the CAC outlet tank flows into the first chamber 304 of the condensation management device 224 via the first conduit 312 and the first inlet port 316. The first conduit 312 may be, for example, coupled to the bottom most portion of the CAC outlet tank 228 and the first inlet port 316.

The first chamber 304 of the condensation management device 224 also includes a first outlet port 320. The first outlet port 320 is connected to the intake manifold 110 via a second conduit 324. In various implementations, an orifice plate 328 may be connected in the second conduit 324 between the first outlet port 320 and the intake manifold 110 to meter (limit or reduce) airflow from the first chamber 304 to the intake manifold 110.

The first chamber 304 may also include a second inlet port 332. The second inlet port 332 may be connected to the crankcase 204, such as via the PCV tube 220. A check valve 336, such as a ball check valve or another suitable type of valve, may be implemented. The check valve 336 opens to allow gas to vent from the crankcase 204 into the first chamber 304 when the pressure within the crankcase 204 is greater than a pressure within the first chamber 304. In various implementations, the check valve 336 may open when the pressure within the crankcase 204 is greater than the pressure within the first chamber 304 by more than a predetermined amount. When the pressure within the crankcase 204 is less than the pressure within the first chamber 304 or not greater than the pressure within the first chamber 304 by more than a predetermined pressure, the check valve 336 may close to prevent flow between the first chamber 304 and the crankcase 204. In various implementations, the second inlet port 332, the check valve 336, and the PCV tube 220 may be omitted.

When vacuum within the intake manifold 110 draws air out of the first chamber 304 through the first outlet port 320 to the intake manifold 110. Vacuum within the intake manifold 110 therefore also creates vacuum within the first chamber 304 of the condensation management device 224. Vacuum within the first chamber 304 draws water (and air when water is not present) from CAC outlet tank 228 to the first chamber 304. Vacuum within the first chamber 304 also causes the check valve 336 to open and draw gas from the crankcase 204 into the first chamber 304.

Gravity, illustrated by 340, forces received water to collect and rest upon a dividing wall 344 that forms a bottom wall of the first chamber 304 and a top wall of the second chamber 308. The dividing wall 344 divides the first chamber 304 from the second chamber 308. An example amount of water 348 within the first chamber 304 is illustrated in FIG. 3.

Figure 4:
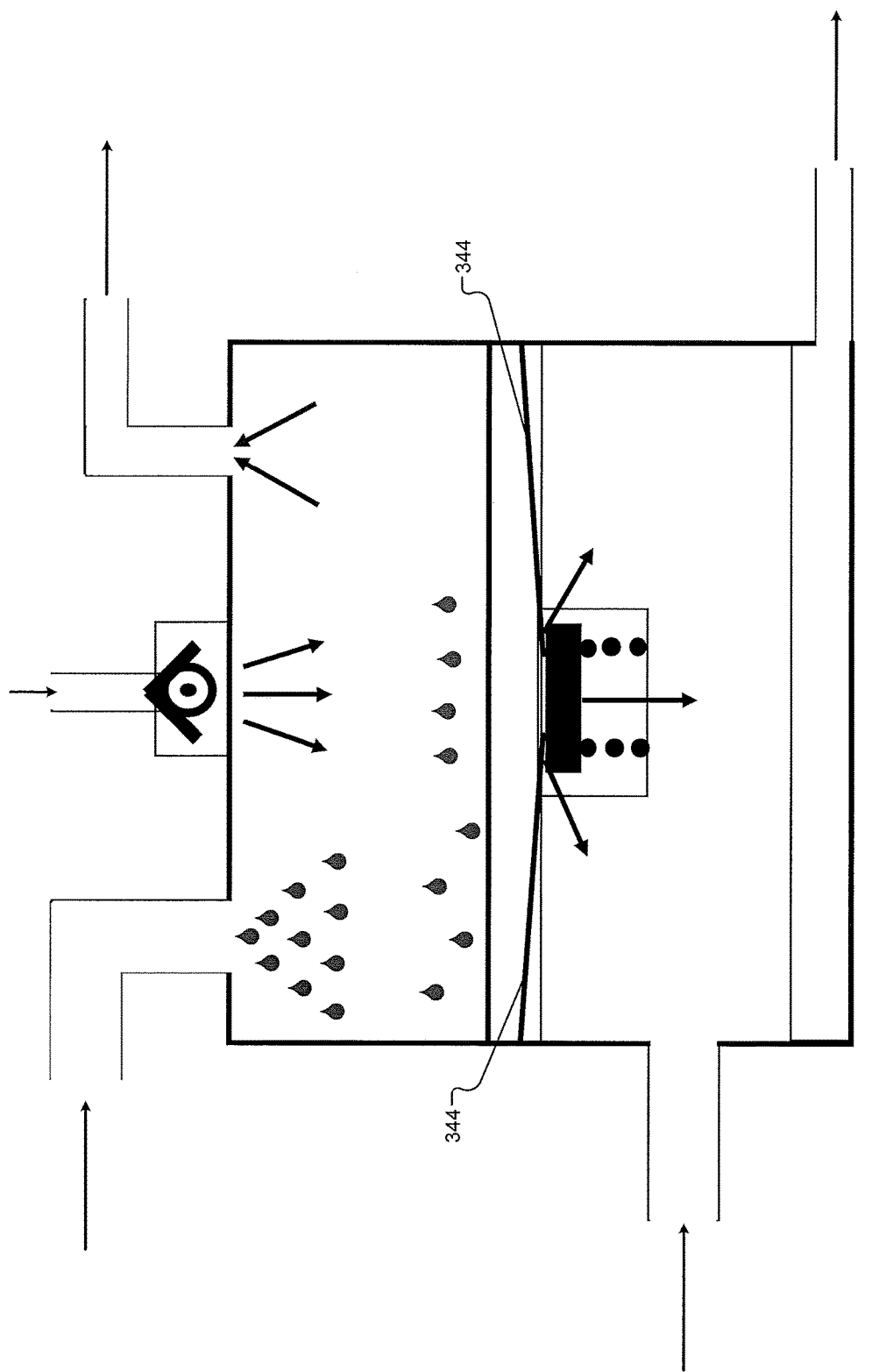

The dividing wall 344 includes an aperture 352 through the dividing wall 344. While the dividing wall 344 is illustrated as being flat, one portion, more than one portion, or all of the dividing wall 344 may be tapered gradually downward toward the aperture 352 to direct water toward the aperture 352. For example, the dividing wall 344 may form an obtuse angle with respect to side walls of the first chamber 304. An example of the dividing wall 344 being tapered is provided in FIG. 4. The angle of the taper, however, could be greater or less than shown.

The condensation management device 224 includes a valve 356 that selectively prevents and allows water to flow into the second chamber 308 from the first chamber 304 through the aperture 352. More specifically, the valve 356 opens the aperture 352 and allows water to flow through the aperture 352 into the second chamber 308 via gravity when a predetermined amount (e.g., mass) of water within the first chamber 304 is greater than a predetermined amount (e.g., predetermined mass) while the engine 102 is running. When the amount of water within the first chamber 304 is less than the predetermined amount while the engine 102 is running, the valve 356 is closed and blocks (plugs) the aperture 352 thereby preventing or minimizing water flow through the aperture 352. The valve 356 is normally open when the engine 102 is not running. More generally speaking, the valve 356 may be open when the pressure within the second chamber 308 is not greater than the pressure within the first chamber 304 by at least a predetermined pressure. When the engine 102 is not running, the pressure within the second pressure 308 may be approximately equal to or equal to the pressure within the first chamber 304, thus allowing the valve 356 to be open.

Figure 5:
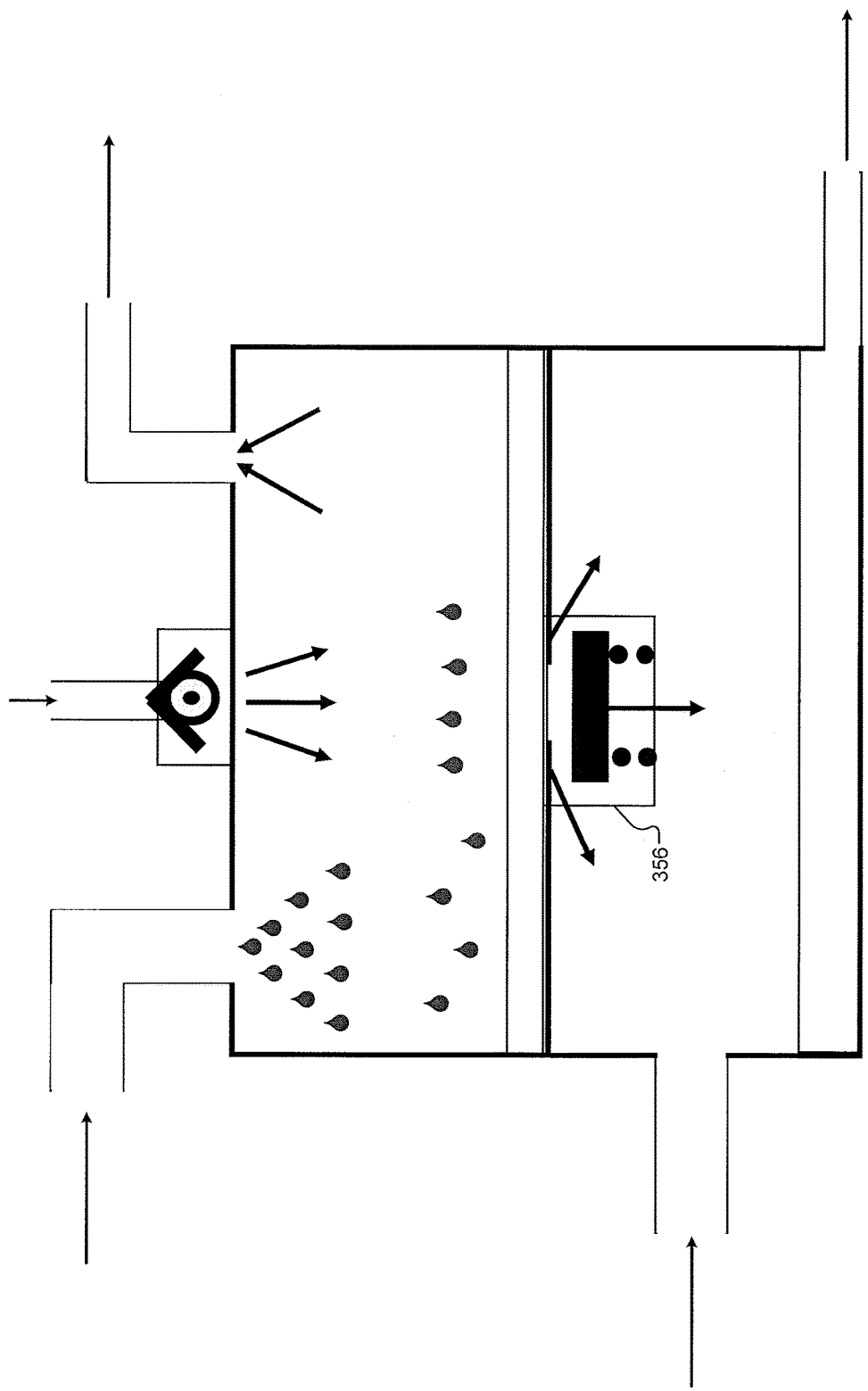

For example, the valve 356 may include a biasing member (e.g., a spring) 360 and a plunger 364. The biasing member 360 maintains the plunger 364 in close proximity to (e.g., within a predetermined distance of) the aperture 352 such that the plunger 364 is drawn into abutment with the aperture 352 when the pressure within the second chamber 308 is greater than the pressure within the first chamber 304. The biasing member 360 may be configured (e.g., spring rate) to allow the plunger 364 to remain against the aperture 352 when the pressure within the second chamber 308 is greater than the pressure within the first chamber 304. The biasing member 360 may be further configured to allow the plunger 364 to move away from the aperture 352 and open the aperture 352 when a mass of water within the first chamber 304 is greater than a predetermined mass while the engine 102 is running (and the pressure within the second chamber 308 is greater than the pressure within the first chamber 304). When the mass of water is less than the predetermined mass while the engine 102 is running, the pressure within the second chamber 308 being greater than the pressure within the first chamber 304 maintains the plunger 364 against the aperture 352 to prevent (or minimize) water flow into the second chamber 308 from the first chamber 304. The valve 356 may be implemented within the second chamber 308 as shown in the example of FIG. 3. However, a similar valve may be implemented within the first chamber 304. An example of the valve 356 being open is provided in FIG. 5.

Figure 6:
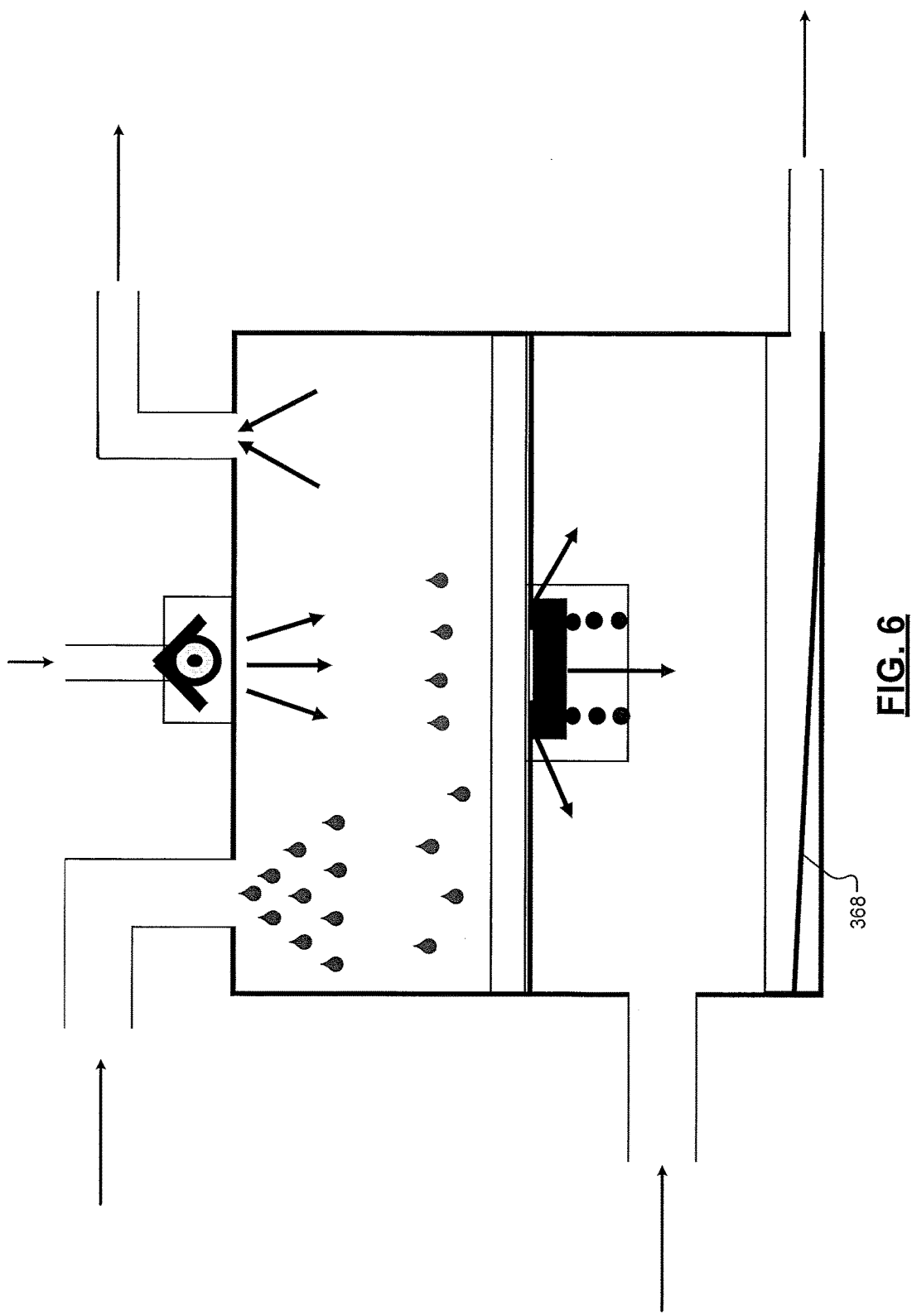

The second chamber 308 of the condensation management device 224 receives water from the first chamber 304 when the valve 356 is open. Gravity forces received water to collect and rest upon a bottom wall 368 of the second chamber 308. An example amount of water 372 within the second chamber 308 is illustrated in FIG. 3. While the bottom wall 368 is illustrated as being flat, one portion, more than one portion, or all of the bottom wall 368 may be tapered gradually downward toward a second outlet port 384 to direct water toward the second outlet port 384. For example, the bottom wall 368 may form an obtuse angle with respect to side walls of the second chamber 308. An example of a portion of the bottom wall 368 being tapered is provided in FIG. 6. The angle of the taper, however, could be greater or less than shown.

The second chamber 308 includes a third inlet port 376. The third inlet port 376 is connected to a location between an outlet of the turbocharger compressor 160-2 and the CAC 164 via a third conduit 380. The second chamber 308 of the condensation management device 224 also includes the second outlet port 384. The second outlet port 384 is connected to a location between the outlet of the CAC 164 and the throttle valve 112 via a fourth conduit 388. In various implementations, a metering device 392, such as a venturi, may be implemented to meter water flow from the condensation management device 224 back to the location between the CAC 164 and the throttle valve 112. The metering device 392 may help distribution of water into the airstream into the engine 102.

When the pressure at the outlet of the turbocharger compressor 160-2 is greater than the pressure at the location between the throttle valve 112 and the CAC 164, the water flows from the second chamber 308 of the condensation management device 224 through the second outlet port 384 back to the intake system 108 for ingestion by the engine 102. Thus, the condensation management device 224 removes water from the CAC 164 and also minimizes possible freezing of the CAC 164 under low temperature conditions. Water within the CAC 164 may be from, for example, melting of frozen water within the CAC 164, intake air humidity, the PCV system, etc.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A condensation management device that removes liquid from a charge air cooler (CAC) receiving output from a turbocharger compressor of an engine, the condensation management device comprising:
   a first chamber including:
      a first outlet port connected to an intake manifold of the engine, wherein air flows from the first chamber through the first outlet port to the intake manifold;
      a first inlet port connected to an outlet of the CAC, wherein liquid flows from the outlet of the CAC into the first chamber through the first inlet port when air flows from the first chamber through the first outlet port to the intake manifold; and
      an aperture through a bottom-most wall of the first chamber;
   a second chamber including:
      a second inlet port connected to a first location between an outlet of the turbocharger compressor and the CAC, wherein air flows into the second chamber from the first location through the second inlet port; and
      a second outlet port connected to a second location between the CAC and a throttle valve of the engine, wherein liquid flows from the second chamber through the second outlet port into an intake system of the engine at the second location; and
   a valve configured to:
      block the aperture when a mass of the liquid within the first chamber is less than a predetermined mass while a first pressure within the first chamber is less than a second pressure within the second chamber; and
      open the aperture when at least one of (i) the mass of the liquid within the first chamber is greater than the predetermined mass and (ii) the first pressure within the first chamber is greater than or equal to the second pressure in the second chamber,
   wherein liquid flows from the first chamber into the second chamber through the aperture when the aperture is open.

2. The condensation management device of claim 1 wherein the first chamber further includes a third inlet port connected to a crankcase of the engine, wherein gas flows from the crankcase into the first chamber through the third inlet port.

3. The condensation management device of claim 2 wherein the first chamber further includes a second valve configured to close the third inlet port when the first pressure within the first chamber is greater than a third pressure within the crankcase and to open the third inlet port when the first pressure within the first chamber is less than the second pressure within the crankcase,
   wherein gas flows from the crankcase into the first chamber through the third inlet port when the third inlet port is open.

4. The condensation management device of claim 3 wherein the second valve includes a ball check valve.

5. The condensation management device of claim 1 wherein air flows from the first chamber through the first outlet port to the intake manifold when a first pressure within the intake manifold is less than a second pressure within the first chamber.

6. The condensation management device of claim 5 wherein air flows into the second chamber from the first location through the second inlet port when a third pressure at the first location is greater than or equal to a fourth pressure within the second chamber.

7. The condensation management device of claim 1 wherein a bottom wall of the first chamber is tapered toward the aperture.

8. The condensation management device of claim 7 wherein a bottom wall of the second chamber is tapered toward the second outlet port.

9. The condensation management device of claim 1 wherein a bottom wall of the second chamber is tapered toward the second outlet port.

10. The condensation management device of claim 1 wherein the first inlet port connected to a bottom most portion of the outlet of the CAC.

11. The condensation management device of claim 1 wherein the valve is implemented within the second chamber.

12. The condensation management device of claim 1 further comprising a venturi connected between the second outlet port and the second location between the CAC and the throttle valve of the engine.

13. The condensation management device of claim 1 further comprising an orifice plate connected between the first outlet port and the intake manifold.

14. A vehicle comprising:
   the condensation management device of claim 1;
   the turbocharger compressor;
   the CAC;
   the throttle valve;
   the intake manifold; and
   the engine.

15. The vehicle of claim 14 further comprising a positive crankcase ventilation (PCV) system that vents gas from a crankcase of the engine to a first location upstream of the turbocharger compressor when a first pressure within the crankcase is greater than a second pressure at the first location.

16. The vehicle of claim 15 wherein the PCV system further vents gas from the crankcase to a second location upstream of the turbocharger compressor when the first pressure within the crankcase is greater than a third pressure at the second location.

17. The vehicle of claim 15 wherein the first chamber of the condensation management device further includes a third inlet port connected to the crankcase of the engine, wherein gas flows from the crankcase into the first chamber through the third inlet port.

18. The vehicle of claim 14 further comprising a venturi connected between the second outlet port of the condensation management device and the second location between the CAC and the throttle valve.

19. The vehicle of claim 18 further comprising an orifice plate connected between the first outlet port of the condensation management device and the intake manifold.

20. A condensation management device that removes liquid from a charge air cooler (CAC) receiving output from a turbocharger compressor of an engine, the condensation management device comprising:

a first chamber that receives liquid from an outlet of the CAC and that includes an aperture through a bottom-most wall of the first chamber;

a second chamber that receives liquid from the first chamber when the aperture is open and that outputs liquid received from the first chamber to an intake system of the engine at a location between the CAC and a throttle valve; and a valve configured to:
block the aperture when a mass of the liquid within the first chamber is less than a predetermined mass while a first pressure within the first chamber is less than a second pressure within the second chamber; and
open the aperture when either of (i) the mass of the liquid within the first chamber is greater than the predetermined mass and (ii) the first pressure within the first chamber is greater than or equal to the second pressure in the second chamber.

* * * * *